United States Patent [19]

Sato et al.

[11] 4,337,665
[45] Jul. 6, 1982

[54] SEMICONDUCTOR PRESSURE DETECTOR APPARATUS WITH ZERO-POINT TEMPERATURE COMPENSATION

[75] Inventors: Hideo Sato; Kanji Kawakami; Motohisa Nishihara, all of Ibaraki, Japan

[73] Assignee: Hitachi, Ltd., Tokyo, Japan

[21] Appl. No.: 121,093

[22] Filed: Feb. 13, 1980

[30] Foreign Application Priority Data

Feb. 26, 1979 [JP] Japan ................................. 54-20847

[51] Int. Cl.³ .............................................. G01B 7/16
[52] U.S. Cl. ......................................... 73/766; 73/708
[58] Field of Search ..................... 73/766, 765, 708; 323/365, 367; 324/130, 65 R

[56] References Cited

U.S. PATENT DOCUMENTS 3,528,022 9/1970 Adams .
3,654,545 4/1972 Demark .
3,847,017 11/1974 Watts .................................. 73/765
4,202,218 5/1980 Romo ................................. 73/766

FOREIGN PATENT DOCUMENTS 1340635 12/1973 United Kingdom .

Primary Examiner—Anthony V. Ciarlante
Attorney, Agent, or Firm—Craig and Antonelli

[57] ABSTRACT

A semiconductor pressure detector apparatus has a strain—electric signal conversion bridge which is composed of four semiconductor strain gauges, and an amplifier which serves to hold at a predetermined value the sum of currents flowing through the bridge. The midpoints of two arms constituting the bridge are respectively connected to the noninverting inputs of two negative feedback amplifiers. Outputs from the two negative feedback amplifiers are applied to a differential amplifier, and an output proportional to the difference of the outputs of the former amplifiers appears at an output terminal of the latter amplifier. A potential equal to potentials which appear at the midpoints of the two arms of the bridge when the bridge is in its balanced state at a predetermined temperature and under a predetermined pressure is generated by two resistances which are connected in series with a supply voltage, and the potential is applied through a switch to either of the inverting inputs of the two negative feedback amplifiers, whereby the zero-point temperature compensation of this apparatus is made.

11 Claims, 3 Drawing Figures

SEMICONDUCTOR PRESSURE DETECTOR APPARATUS WITH ZERO-POINT TEMPERATURE COMPENSATION

BACKGROUND OF THE INVENTION

This invention relates to a semiconductor pressure detector (or sensor) apparatus, and more particularly to a semiconductor pressure detector apparatus having means to carry out zero-point temperature compensation.

In order to measure mass, stress, fluid pressure etc., various gauges have been used. Among them, a semiconductor strain gauge of high sensitivity exploiting the piezoresistive effect of a semiconductor has come into wide use in recent years.

The semiconductor strain gauge exploiting the piezo effect of a semiconductor has the advantage that the rate of change of the resistance to the strain or the gauge factor is high, whereas it has the disadvantage that the resistance value and gauge factor of the gauge exhibit great temperature-dependencies and are unstable.

In general, the resistance value R of the semiconductor strain gauge is given by the following expression:

$$R = R_o(1+\alpha T)\{1+S\gamma(1+\beta T)\} \quad (1)$$

where $R_o$ denotes the resistance value of the gauge in the strainless state at a predetermined temperature, T the temperature of the semiconductor strain gauge, S the strain, $\alpha$ the temperature coefficient of the resistance, $\beta$ the temperature coefficient of the gauge factor, and $\gamma$ the gauge factor. The gauge factor $\gamma$ has its value and polarity varied depending upon the orientation of a semiconductor single crystal, the angle defined by current and stress within the gauge, etc.

Expression (1) is expanded as follows:

$$R = R_o(1+\alpha T) + R_o(1+\alpha T)(1+\beta T)S\gamma \quad (2)$$

$$\approx R_o(1+\alpha T) + R_o\{1+(\alpha+\beta)T\}S\gamma \quad (3)$$

The second term of the right hand of Expression (2) is the variation of the gauge resistance due to the strain. On the other hand, the coefficient $\alpha$ varies depending upon an impurity concentration within the crystal of the semiconductor strain gauge and has a value of 3000–600 ppm/°C. in case of silicon single crystal by way of example, and the coefficient $\beta$ is independent of the impurity concentration and has a value of approximately $-2000$ ppm/°C. in the case of silicon single crystal. The variation of the gauge resistance can have its temperature-dependency made low because, as apparent from the second term of Expression (3), the temperature coefficient $\alpha$ of the resistance of the semiconductor strain gauge and the temperature coefficient $\beta$ of the gauge factor can be cancelled by appropriately selecting the impurity concentration within the crystal. Accordingly, a strain-electric signal conversion bridge which employs the semiconductor strain gauges is often driven by a constant-current source in order to provide only the variation of the resistance as an output signal.

It has also been known that, in a strain-electric signal conversion apparatus of high precision, the drive current is varied depending upon the temperature in order to further reduce the temperature-dependency.

The output of the strain-electric signal conversion bridge at the time when the strain is zero exhibits the so-called temperature-dependency in which it changes with a temperature change, on account of the discrepancies of the resistance values $R_o$ and their temperature coefficients $\alpha$ of the plurality of gauges constituting the bridge. This temperature-dependency is the zero-point temperature-dependency, and it is the zero-point temperature compensation that reduces and compensates for such temperature-dependency.

For example, U.S. Pat. No. 3,654,545 entitled "SEMICONDUCTOR STRAIN GAUGE AMPLIFIER" (issued on Apr. 4, 1972) discloses a semiconductor strain gauge amplifier which includes a temperature sensor such as thermistor in order to realize such zero-point temperature compensation. Such compensation circuit, however, is complicated disadvantageously.

Other related references are:
U.S. Pat. No. 3,528,022 entitled "Temperature Compensating Networks" and
British Pat. No. 1,340,635 entitled "Improvements in Direct Current Pressure Ratio Circuit".

SUMMARY OF THE INVENTION

An object of this invention is to provide a semiconductor pressure detector which has a zero-point temperature compensation circuit of simple structure and whose output does not vary even when the ambient temperature has changed.

The object of this invention is accomplished by a semiconductor pressure detector apparatus having a strain-electric signal conversion bridge which includes at least one semiconductor strain gauge between a midpoint of each of two arms with both their ends connected and one end of the corresponding arm, means to put a sum of currents of the two arms into a predetermined value, two negative feedback amplifiers whose inverting input terminals are connected to each other through a resistance and whose noninverting input terminals are connected to the midpoints of the two arms of the bridge, and a differential amplifier which differentially amplifies output of the two amplifiers. The apparatus is characterized in that it includes means to generate a potential equal to midpoint potentials of the arms at the time when the semiconductor strain gauges are balanced under predetermined conditions, and means to apply this potential to at least one of the inverting input terminals of the negative feedback amplifiers.

DETAILED DESCRIPTION OF THE PREFERRED EMBODIMENTS

Before describing this invention, "Strain Gauge Pressure Transducer Apparatus" (U.S. Ser. No. 971,358 filed on Dec. 20, 1978) already proposed by the same inventor will be explained.

Figure 1:
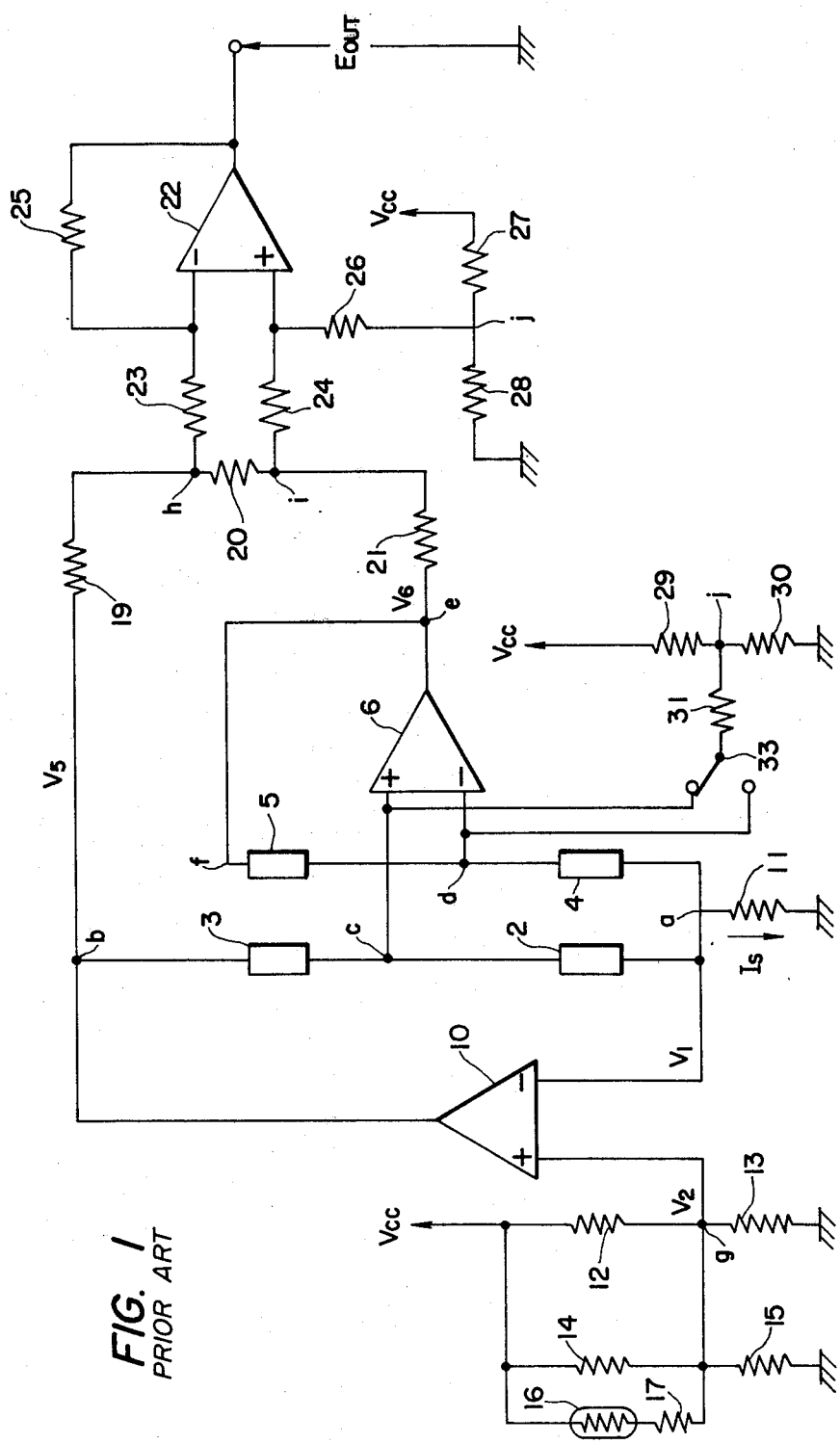
FIG. 1 is a circuit diagram for explaining a strain gauge pressure transducer apparatus which has been proposed by the same inventor as in this invention.

In FIG. 1, reference numerals 2–5 designate semiconductor gauges, among which the semiconductor strain gauges 2 and 3 constitute one arm of a strain-electric signal converting bridge and the semiconductor gauges 4 and 5 constitute another arm. Current $I_s$ of the sum between currents flowing through the two arms flows through a resistance 11. A voltage drop $V_1$ across the resistance 11 is compared by an amplifier 10 with a reference voltage $V_2$ from a reference voltage circuit which consists of resistances 12–15 and 17 and a thermistor 16. Thus, a voltage $V_5$ is controlled so that both the voltages may coincide. Accordingly, the sum of the currents flowing through the two arms of the bridge is controlled so as to become a predetermined value by means of the reference voltage circuit, the amplifier 10 and the resistance 11. An amplifier 6 amplifies the difference between potentials at the midpoints c and d of the two arms of the bridge. The output $V_6$ of the amplifier 6 is negatively fed-back to a point f, whereby the output voltage $V_6$ is controlled so as to equalize the potentials of the midpoints c and d of the bridge.

By way of example, let it be supposed that a strain has been given to increase the resistance values of the semiconductor gauges 2 and 5 and to decrease those of the gauges 3 and 4. Then, the current of the arm including the gauges 2 and 3 decreases, and the potential $V_5$ of a point b lowers. On the other hand, the current flowing through the arm including the gauges 4 and 5 increases, and the potential $V_6$ of the point f rises. The difference $(V_5 - V_6)$ between the potentials of the point b and a point e is amplified by an amplifier 22, the output signal of which is delivered to an output terminal.

Resistances 26–28 are disposed in order to set the output reference voltage of the amplifier 22. A resistance 20 serves to set the output change of the amplifier 22 corresponding to a predetermined strain change, and its resistance value is determined depending upon the sensitivity of the strain gauges.

In this apparatus, the zero-point temperature compensation is carried out in such a way that a voltage which is substantially equal to those of the midpoints c and d of the two arms of the bridge in the state in which the bridge is balanced at the normal temperature and under the zero pressure is generated by a reference potential generator circuit made up of resistances 29–31, and that this voltage is applied to the midpoint of either of the two arms through a switch 33. The sign of the compensation is selected with the switch 33, and the quantity thereof is determined by the magnitude of the resistance value of the resistance 31. The resistance value $R_{31}$ of the resistance 31 is decided by the following expression:

$$R_{31} = G \cdot R \cdot \frac{\Delta V_B}{\Delta E_{OUT}} = \frac{R_0^2}{\Delta E_{OUT}} \cdot \alpha \cdot T \cdot I_S \cdot G \quad (4)$$

where G denotes the gain of the differential amplifier 22, R the resistance value of the semiconductor strain gauge, $\Delta V_B$ the variation of the midpoint voltages of the arms corresponding to a prescribed temperature change, $\Delta E_{OUT}$ the variation of the output corresponding to the reference strain in the case of the prescribed temperature change, $R_O$ the initial resistance value of the semiconductor strain gauges 2–5, T the temperature, and $I_S$ the magnitude of the current to be supplied to the two arms of the bridge.

As indicated by Expression (4), the resistance value $R_{31}$ of the resistance 31 is proportional to the gain G of the differential amplifier 22. However, the gain G of the amplifier 22 is determined by the resistance 20 which in turn is decided by the sensitivity of the semiconductor strain gauges, resulting in the disadvantage that the gains G become unequal in the respective apparatuses. The apparatus as above described is also disadvantageous in being affected by the resistance value R of the semiconductor strain gauges. This resistance value R is also dependent upon the initial resistance value $R_O$ of the strain gauges and the value of the temperature coefficient $\alpha$ thereof.

Figure 2:
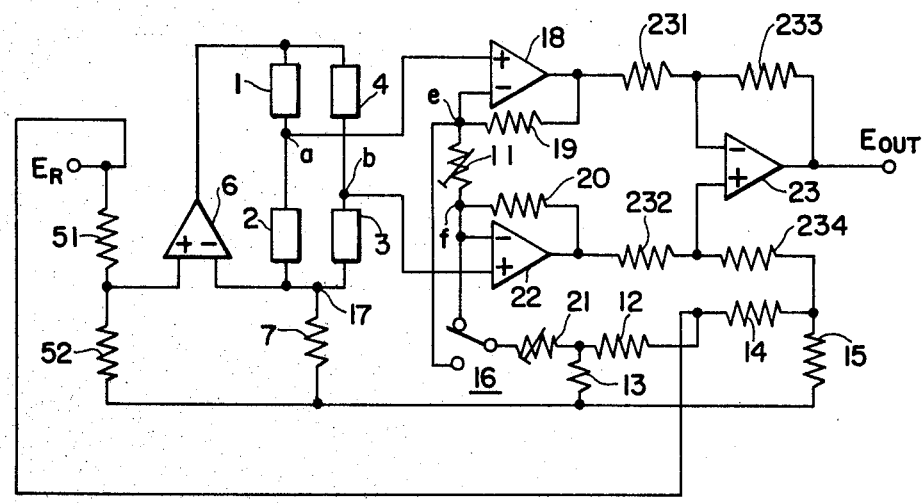
FIG. 2 is a circuit diagram showing an embodiment of a semiconductor pressure detector apparatus according to this invention.

Referring now to FIG. 2, numerals 1–4 designate semiconductor strain gauge, the resistance values of which are respectively varied in response to a given strain. The semiconductor strain gauges 1 and 3 vary the resistance values in the opposite polarities to those of the other semiconductor strain gauges 2 and 4.

The semiconductor strain gauges 1 and 2 constitute one arm of a strain-electric signal conversion bridge, while the semiconductor strain gauges 3 and 4 constitute another arm. Currents flowing through the two arms of the bridge are added up at a point 17, the sum current flowing through a resistance 7. A voltage drop across the resistance 7 is compared by an amplifier 6 with an output voltage from a reference voltage circuit made up of series resistances 51 and 52, and the current to be supplied to the two arms of the bridge is controlled so that both the voltages may coincide. More specifically, the voltage drop across the resistance 7 is applied to the inverting input of the amplifier 6, and a supply voltage $E_R$ divided by the series resistances 51 and 52 is applied to the noninverting input thereof. Accordingly, the sum of the currents flowing through the two arms of the bridge is held at a predetermined value which is decided by the reference voltage circuit.

The midpoints a and b of the two arms of the strain-electric signal conversion bridge are respectively connected to the noninverting inputs of amplifiers 18 and 22. The amplifiers 18 and 22 are respectively subjected to negative feedback through resistances 19 and 20, and the inverting inputs of the amplifiers 18 and 22 are connected to each other through a variable resistance 11. Further, either of the inverting input of the amplifier 18 and that of the amplifier 22 is connected by means of a switch 16 and through a variable resistance 21 to a reference potential circuit which consists of two resistances 12 and 13 connected in series with the supply voltage $E_R$. The reference potential circuit is adjusted so that, by dividing the supply voltage $E_R$ by means of the two series resistances, it may generate the same potential as those of the midpoints a and b of the two arms in the state in which the bridge is balanced at a certain specified temperature (e.g., normal temperature of 18° C.) and under a certain specified pressure (e.g., zero pressure).

The outputs of the amplifiers 18 and 22 are respectively applied to the inverting input and noninverting input of a differential amplifier 23 through resistances 231 and 232. A feedback resistance 233 is inserted between the output of the differential amplifier 23 and the inverting input thereof. Further, the midpoint of two resistances 14 and 15 which are connected in series with the supply voltage $E_R$ is connected to the noninverting input of the differential amplifier 23 through a resistance 234. These two resistances 14 and 15 form a zero-point adjusting circuit which serves to set the output value of the differential amplifier 23 corresponding to a predetermined strain. The variable resistance 11 is disposed in order to set the output changes of the amplifiers 18 and 22 corresponding to the predetermined strain.

Now, when a pressure is applied to the semiconductor strain gauges, the resistance values of the semiconductor strain gauges 1, 2, 3 and 4 vary in accordance with the magnitude of the pressure, and a difference arises between the potentials of the midpoints a and b of the two arms of the bridge. The midpoint potentials are amplified by the amplifiers 18 and 22, and the difference of the amplified midpoint potentials is taken by the differential amplifier 23 to obtain the output $E_{OUT}$.

The zero-point temperature compensation will now be described. The zero-point temperature compensation is realized in such a way that the reference potential from the foregoing reference potential circuit, namely, the potential equal to those of the midpoints a and b of the two arms of the bridge balanced at the normal temperature is connected to either of the inverting input points e and f of the amplifiers 18 and 22 through the variable resistance 21 and by means of the switch 16. The sign of the zero-point temperature compensation is determined by a contact to which the switch 16 is connected, and the quantity of the compensation is determined by the magnitude of the resistance value of the variable resistance 21.

The amplifiers 18 and 22 are made up of operational amplifiers of high gain, and the outputs of these amplifiers 18 and 22 are connected to the inverting inputs of their own through the respective resistances 19 and 20. Therefore, the potentials of the points e and f are substantially equal to the potentials of the midpoints a and b of the two arms of the bridge.

The resistance value $R_{21}$ of the variable resistance 21 which determines the quantity of the compensation is evaluated by the following expression:

$$R_{21} = \frac{R_{19}}{A} \cdot \frac{\Delta V_B'}{\Delta E_{OUT}} \quad (5)$$

where A denotes the gain of the differential amplifier 23, $R_{19}$ the resistance value of the resistance 19 or 20, and $\Delta V_B'$ the voltage variation (substantially equal to $\Delta V_B$) between the points e and f corresponding to a prescribed temperature.

In the individual strain-electric signal conversion apparatuses, the output variations corresponding to the predetermined strain are adjusted by adjusting the variable resistances 11. As apparent from Expression (5), the output variation corresponding to the predetermined strain is not influenced by the resistance value $R_{11}$ of the variable resistance 11. In other words, in the strain-electric signal conversion apparatus according to the present embodiment, the resistance value $R_{21}$ of the resistance 21 for the zero-point temperature compensation is not affected by the resistance value $R_{11}$ of the variable resistance 11 for adjusting the variation of the output.

Hereunder will be described the zero-point temperature compensation of the circuit stated above. It is now assumed by way of example that a rise in the ambient temperature has cast the balance of the bridge, in other words, rendered the potential of the midpoint a of the bridge higher than the potential of the midpoint b. Then, both the output voltages of the amplifiers 18 and 22 rise with increases in the resistance values of the gauges 1–4 of the bridge, but the output of the amplifier 18 becomes slightly greater than the output of the amplifier 22. Therefore, if the zero-point temperature compensation circuit for the amplifiers is not disposed, the output $E_{OUT}$ of the differential amplifier 23 will generate a negative output. At this time, however, in a case where the switch 16 is connected to the upper contact, that is, where the voltage of the midpoints of the bridges balanced at the normal temperature and under the zero pressure is connected to the inverting input of the amplifier 22, current which is fed-back to this inverting input through the resistance 20 is increased. This is because a still greater current flows via the resistance 21 owing to the difference between the output voltage of the amplifier 22 and the voltage of the node of the resistances 12 and 13. Therefore, the output voltage of the amplifier 22 increases, and the output of the differential amplifier 23 rises and finally becomes zero. When the signs of the potentials of the midpoints a and b of the bridge have fallen into the opposite relation, the switch 16 is thrown onto the lower side.

Figure 3:
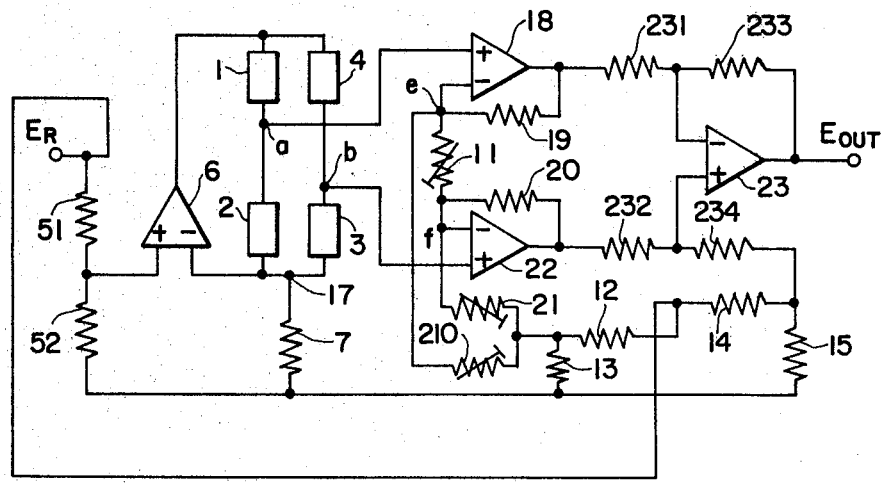
FIG. 3 is a circuit diagram showing another embodiment of the semiconductor pressure detector apparatus according to this invention.

FIG. 3 shows another embodiment of the semiconductor pressure detector apparatus according to this invention. In this embodiment, the zero-point temperature compensation is realized in such a way that the node of the two series resistances 12 and 13 is connected to the inverting inputs of the amplifiers 18 and 22 through variable resistances 210 and 21, respectively. The polarity of the compensation is determined by the sign of the difference between the resistance values of the resistances 21 and 210, and the resistance values $R_{21}$ and $R_{210}$ of the respective resistances 21 and 210 with respect to the quantity of compensation are determined by the following expression:

$$R_{21} = \frac{R_{19}}{A} \cdot \frac{V_B'}{\Delta E_{OUT} + \frac{R_{19}}{A} \cdot \frac{V_B'}{R_{210}}} \quad (6)$$

Accordingly, the value of the resistance $R_{21}$ can be replaced with the value of the resistance $R_{210}$ with respect to a fixed quantity of compensation, and the degree of freedom is great.

As apparent from the foregoing, according to this invention, the zero-point temperature compensation does not require any temperature sensor and is therefore inexpensive. Moreover, since only one element needs to be adjusted, the adjustment of the quantity of compensation is facilitated. Further, since the determination of the quantity of compensation is not affected by the resistance for adjusting the output variation responsive to the predetermined strain, it is easy, which brings forth the advantage that the detector apparatus is suited to mass production.

What is claimed is:

1. A semiconductor pressure detector apparatus comprising:
    a strain-electric signal conversion bridge which has two arms with both their ends connected, at least one semiconductor strain gauge being included between midpoints of the two arms and one end of the corresponding arm;
    means to hold at a predetermined value a sum of currents flowing through the two arms of said bridge;
    two negative feedback amplifiers whose inverting input terminals are connected to each other through a resistance and whose noninverting input terminals are connected to the midpoints of the two arms of said bridge;

a differential amplifier which differentially amplifies outputs of said two amplifiers;

means to generate a potential that is equal to potentials of the midpoints of the two arms in a state in which said bridge is balanced at a predetermined temperature and under a predetermined pressure; and means to apply the potential of the midpoint potential generating means equal to the potentials of the midpoints, to the inverting input terminal of one of said two negative feedback amplifiers through a resistance.

2. A semiconductor pressure detector apparatus comprising:

a strain-electric signal conversion bridge which has two arms with both their ends connected, at least one semiconductor strain gauge being included between midpoints of the two arms and one end of the corresponding arm;

means to hold at a predetermined value a sum of currents flowing through the two arms of said bridge;

two negative feedback amplifiers whose inverting input terminals are connected to each other through a resistance and whose noninverting input terminals are connected to the midpoints of the two arms of said bridge;

a differential amplifier which differentially amplifies outputs of said two amplifiers;

means to generate a potential that is equal to potentials of the midpoints of the two arms in a state in which said bridge is balanced at a predetermined temperature and under a predetermined pressure; and means to apply the potential of the midpoint potential generating means equal to the potentials of the midpoints, to the inverting input terminals of said two negative feedback amplifiers through resistances respectively.

3. A semiconductor pressure detector apparatus as defined in claim 1 or claim 2, wherein said midpoint potential generating means includes of two resistances which are connected in series with a supply voltage.

4. A semiconductor pressure detector apparatus as defined in claim 1, wherein the midpoint potential applying means includes a change-over switch coupled to each of the inverting input terminals of said negative feedback amplifiers for selecting one of said inverting input terminals for coupling to said midpoint potential generating means.

5. A semiconductor pressure detector apparatus as defined in claim 1 or claim 2, wherein said strain-electric signal conversion bridge has four semiconductor strain gauges.

6. A semiconductor pressure detector apparatus as defined in claim 1 or claim 2, wherein said two negative feedback amplifiers are comprised of operational amplifiers.

7. A semiconductor pressure detector apparatus as defined in claim 1, wherein the midpoint potential applying means applies the potential of the midpoint potential generating means to said inverting terminal through a variable resistance.

8. A semiconductor pressure detector apparatus as defined in claim 1 or 2, wherein said means for holding at a predetermined value the sum of the currents flowing through the two arms of said bridge comprises a differential amplifier having an inverting terminal coupled to one end of said arms, a non-inverting terminal coupled to a reference supply voltage, and an output terminal coupled to the other end of said arms.

9. A semiconductor pressure detector apparatus as defined in claim 8, wherein said midpoint potential generating means includes a pair of resistors connected in series with said reference supply voltage.

10. A semiconductor pressure detector apparatus as defined in claim 1 or 2, wherein said predetermined pressure is zero pressure.

11. A semiconductor pressure detector apparatus as defined in claim 9, wherein said predetermined pressure is zero pressure.

* * * * *